June 21, 1966 J. GROSVALET ETAL 3,257,246
METHODS FOR MANUFACTURING SEMICONDUCTOR DEVICES
Filed July 9, 1962
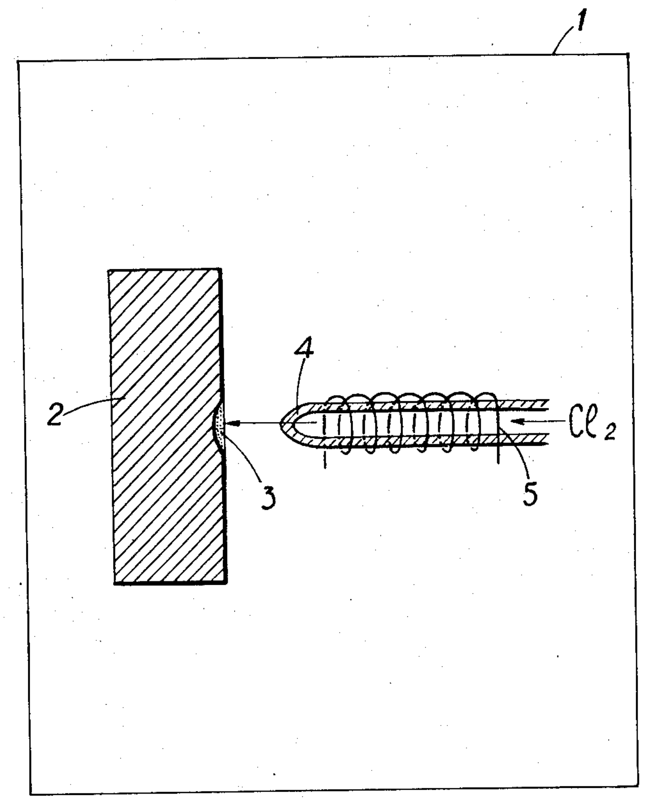
JEAN GROSVALET
PIERRE LECLERC
Inventors United States Patent Office 3,257,246

Patented June 21, 1966

3,257,246
METHODS FOR MANUFACTURING SEMICONDUCTOR DEVICES

Jean Grosvalet and Pierre Leclerc, Paris, France, assignors to C.S.F.-Compagnie Générale de Telegraphie Sans Fil, a corporation of France Filed July 9, 1962, Ser. No. 208,532
Claims priority, application France, Aug. 4, 1961, 870,012
4 Claims. (Cl. 148—175)

The present invention relates to methods for manufacturing semiconductor devices. More particularly, it relates to a method of manufacturing diode or transistor devices having a silicon body and one or more silicon junctions.

It is known to produce germanium junctions by locally forming a cavity in the surface of a germanium wafer by means of an electrolyte jet and depositing in this cavity a suitable activator impurity, for example a donor or an acceptor material such as indium. To this effect, an electrolyte may be used, one of the ions of which is that of the activator substance to be deposited: in accordance with the direction of the current flow, the electrolyte jet, consisting, for example of indium chloride, successively forms the cavity, then provides the deposit necessary for establishing the junction.

This method, however, is not readily usable for producing silicon junctions, as there is no adequate electrolyte readily available in this case.

It is an object of the invention to provide a method combining the advantages mentioned hereinabove and which may be applied for producing both silicon and germanium junctions.

The method according to the invention comprises essentially forming a local cavity in the surface of a semiconductor body by means of a gaseous jet having a controllable chemical action thereon and depositing, if necessary, in the cavity thus formed, also by means of a gaseous jet, a layer of the same semiconductor material containing the desired impurity.

According to a preferred embodiment of the invention, the gaseous jet consists of a halogen, generally chlorine or iodine, while, for forming a junction, a halide jet corresponding to the semiconductor material of the body is used.

The invention will be best understood from the following nonlimitative example, relating to the manufacture of silicon transistors and the appended drawing, the single figure of which illustrates, very diagrammatically, an application of a method according to the invention.

In this figure a silicon body 2 is placed inside an enclosure 1, adapted to protect the operator during the operation.

According to the invention, a cavity 3 is obtained in a predetermined portion of the surface of body 2 by means of a capillary jet of a gas said jet having a section which is coextensive with said portion, and being directed along the arrow from a capillary nozzle 4 as can be seen in the drawing, the expression "having a section which is coextensive with said portion" means that the capillary nozzle is aligned with the portion of the surface in which the cavity is to be formed. The latter is preferably fitted with an electric heating resistance 5. In the drawing, the intake of the etching gas is indicated by the symbol $Cl_2$, this gas being, for example, chlorine. Other gases, such as iodine in the vapor state, may also be employed.

The gas bites into body 2 and the action may be readily controlled by any means known in the art.

When the formation of the cavity is terminated, and if it is desired to form a junction, advantage is taken of the favorable condition of the surface of body 2, due to the formation of the cavity by the gas jet, for depositing immediately therein a silicon layer containing the desired activator substance.

According to the invention, this deposition is effected by means of the device illustrated in the drawing. Instead of chlorine, a mixture of silicon-tetrachloride and hydrogen is used, containing a suitable gaseous activator impurity, for example phosphorous chloride or boron bromide; the hydrogen releases the silicon from the silicon tetrachloride, and the silicon thus released deposits in cavity 3.

The temperature of nozzle 4 is so adjusted as to enable the formation, by epitaxy, of a doped crystallized silicon layer in cavity 3.

A second junction may be simultaneously produced on the opposite face of body 2. The second nozzle, which is necessary in this case, has not been shown; neither the arrangements for supporting and heating the semiconductor body and the feeding system of the nozzle have been shown, since arrangements of this type are well known in the art.

It is to be understood that the example described is in no way limitative. Thus, the attack of the semiconductor may be effected by using a gas such as a silicon halide, and by modifying the balance in a reaction of the type $$Si+SiX_4 \rightleftarrows 2SiX_2$$

for example, by varying the temperature or the concentration.

The gas may be directed against the semiconductor body in many ways: thus, instead of using a capillary nozzle, the gas employed may be ionized, for example by means of a wire subjected to a high voltage, the gaseous jet being then directed onto the surface to be cut out by means of electrostatic lenses. This is of particular interest when cavities of complex shape are to be formed.

Another method of limiting accurately the surface to be etched by the gas is to screen the remainder of the surface of the silicon body with a silica layer which resists to chlorine under the conditions described.

Of course body 2 need not be formed by silicon. Any other semiconductor could be used, for example, germanium.

What is claimed is:

1. A method for manufacturing a semiconductor device from a monocrystalline semiconductor body comprising the steps of forming a local cavity in the surface of said body, by directing on a predetermined portion of said surface, a capillary jet of a gas having a chemical action on said semiconductor, said jet having a section which is coextensive with said portion and depositing in said cavity a layer consisting of the same semiconductor material containing an impurity, by directing into said cavity a jet of a gaseous mixture having the same section as said first mentioned jet including said semiconductor and said impurity as components.

2. A method for manufacturing a semiconductor device from a monocrystalline silicon body comprising the steps of forming a local cavity in the surface of said body by directing, on a predetermined portion of said surface, a capillary jet of a halogen in gaseous state, said jet having a section which is coextensive with said portion and depositing in said cavity a silicon layer containing an impurity for forming a semiconductor junction by directing in said cavity a gaseous jet of hydrogen having the same section as said first mentioned, carrying a silicon halide and a halide of said impurity.

3. A method for manufacturing a semiconductor device from a monocrystalline silicon body comprising the steps of forming a local cavity in the surface of said body by directing, on a predetermined portion of said surface, a capillary jet of chlorine, said jet having a section which is coextensive with said portion and depositing in said cavity a silicon layer with an impurity modifying its conductivity by directing in said cavity a hydrogen jet, having the same section as that previously used in said cavity forming step, carrying a mixture of silicon tetrachloride and phosphorus chloride.

4. A method for manufacturing a semiconductor device from a monocrystalline silicon body comprising the steps of forming a local cavity in the surface of said body by directing thereon a jet of chlorine and depositing in said cavity a silicon layer with an impurity modifying its conductivity by directing in the formed cavity a jet, having the same section as that previously used in said cavity forming step, of a mixture of silicon tetrachloride, hydrogen and boron bromide.

References Cited by the Examiner

UNITED STATES PATENTS

| | | | |
|---|---|---|---|
| 2,744,000 | 5/1956 | Seiler | 148—1.5 X |
| 3,000,768 | 9/1961 | Marinace | 148—1.5 |
| 3,065,116 | 11/1962 | Marinace | 148—1.5 |

FOREIGN PATENTS

| | | |
|---|---|---|
| 1,029,941 | 5/1958 | Germany. |

DAVID L. RECK, *Primary Examiner.*

RAY K. WINDHAM, *Examiner.*

M. A. CIOMEK, H. BIZOT, N. F. MARKVA, *Assistant Examiners.*